US010859165B2

(12) United States Patent
Guthrie

(10) Patent No.: US 10,859,165 B2
(45) Date of Patent: Dec. 8, 2020

(54) SEAL SURFACE ADAPTER FOR USE WITH TOILET FLUSH VALVES

(71) Applicant: Kevin J. Guthrie, Wind Lake, WI (US)

(72) Inventor: Kevin J. Guthrie, Wind Lake, WI (US)

(73) Assignee: Lavelle Industries, Inc., Burlington, WI (US)

(*) Notice: Subject to any disclaimer, the term of this patent is extended or adjusted under 35 U.S.C. 154(b) by 177 days.

(21) Appl. No.: 15/904,910

(22) Filed: Feb. 26, 2018

(65) Prior Publication Data

US 2018/0245695 A1    Aug. 30, 2018

Related U.S. Application Data

(60) Provisional application No. 62/464,698, filed on Feb. 28, 2017.

(51) Int. Cl.
  *F16K 1/20*     (2006.01)
  *F16J 15/3236*  (2016.01)
  *E03D 1/34*     (2006.01)
  *E03D 1/30*     (2006.01)

(52) U.S. Cl.
  CPC ............ *F16K 1/2057* (2013.01); *E03D 1/308* (2013.01); *E03D 1/34* (2013.01); *F16J 15/3236* (2013.01)

(58) Field of Classification Search
  CPC . E03D 1/34; E03D 11/13; E03D 11/00; F16K 1/2057; F16K 1/2064; F16J 15/3236
  See application file for complete search history.

(56) References Cited

U.S. PATENT DOCUMENTS

| 1,300,138 | A | * | 4/1919  | Dowling ................... E03D 1/34 4/390 |
| 2,660,459 | A | * | 11/1953 | Collins ................ F16J 15/3236 277/530 |
| 2,700,774 | A |   | 2/1955  | Smith |
| 2,907,050 | A | * | 10/1959 | Harris ....................... E03D 1/34 4/403 |
| 3,448,665 | A | * | 6/1969  | Allinquant .............. E21D 15/44 92/181 R |
| 3,510,101 | A | * | 5/1970  | Burtis ................... F16K 1/2007 251/228 |
| 3,653,672 | A | * | 4/1972  | Felt ...................... F16J 15/3236 277/556 |
| 3,939,507 | A |   | 2/1976  | Clark |
| 4,002,521 | A | * | 1/1977  | Schoepe ................... E03D 1/34 156/293 |
| 4,045,037 | A | * | 8/1977  | Pippert ................ F16J 15/3236 277/438 |

(Continued)

FOREIGN PATENT DOCUMENTS

| EP | 0915278       | 12/1999 |           |
| JP | 2009040346 A * | 2/2009  | ........... B60T 11/236 |
| WO | 2001006066    | 1/2001  |           |

*Primary Examiner* — Eugene G Byrd
(74) *Attorney, Agent, or Firm* — Davis & Kuelthau, sc; Joseph S. Heino; Erin E. Kaprelian

(57) ABSTRACT

An apparatus comprises a ring, a top portion, and a bottom portion. The apparatus further comprises a first leg and a second leg. In addition, the apparatus comprises a horizontal portion. The horizontal portion connects the first leg and the second leg. The legs and horizontal portion, together with an adhesive, overlay and sealingly engage the top rim of a flush valve wall, which is part of a toilet flush valve.

17 Claims, 7 Drawing Sheets

(56) References Cited

U.S. PATENT DOCUMENTS

| | | | |
|---|---|---|---|
| 4,385,406 A | 5/1983 | Miskiewicz | |
| 4,984,312 A | 1/1991 | Pickerrell et al. | |
| 5,325,547 A | 7/1994 | Pino | |
| 6,173,457 B1* | 1/2001 | Higgins | E03D 1/304 |
| | | | 4/393 |
| 6,339,882 B1 | 1/2002 | Goessling et al. | |
| 6,637,043 B1* | 10/2003 | Lordahl | E03D 1/306 |
| | | | 4/378 |
| 6,789,275 B2 | 9/2004 | Spells, Sr. et al. | |
| 8,365,320 B1* | 2/2013 | Lordahl | E03D 1/34 |
| | | | 4/378 |
| 8,943,620 B2* | 2/2015 | Schuster | E03D 1/14 |
| | | | 4/324 |
| 10,294,647 B2* | 5/2019 | Coronado | E03D 11/16 |
| 2004/0163165 A1 | 8/2004 | Ortiz et al. | |
| 2004/0245726 A1* | 12/2004 | Gravier | F16J 15/3236 |
| | | | 277/438 |
| 2009/0071325 A1* | 3/2009 | Hanaoka | F15B 7/08 |
| | | | 92/168 |
| 2011/0012313 A1* | 1/2011 | Lev | F16J 15/3236 |
| | | | 277/562 |
| 2011/0115168 A1* | 5/2011 | Miller | F16J 15/166 |
| | | | 277/562 |
| 2012/0326395 A1* | 12/2012 | McCarthy | F16J 15/188 |
| | | | 277/551 |
| 2014/0264137 A1* | 9/2014 | Linser | F16J 15/164 |
| | | | 251/359 |
| 2015/0285390 A1* | 10/2015 | Grau | F16J 15/3212 |
| | | | 123/188.4 |
| 2016/0116065 A1* | 4/2016 | Putkowski | F16J 15/064 |
| | | | 277/550 |
| 2016/0290507 A1* | 10/2016 | Chapagain | F16J 15/50 |
| 2017/0051738 A1* | 2/2017 | Horning | F04B 53/02 |
| 2017/0074403 A1* | 3/2017 | Almeida | F16J 15/3232 |
| 2018/0283289 A1* | 10/2018 | Tanaka | F16J 15/3236 |

* cited by examiner

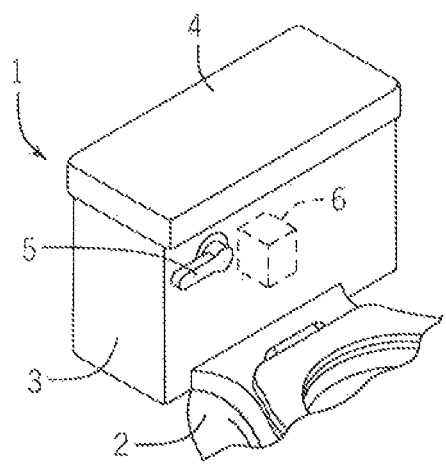
FIG. 1
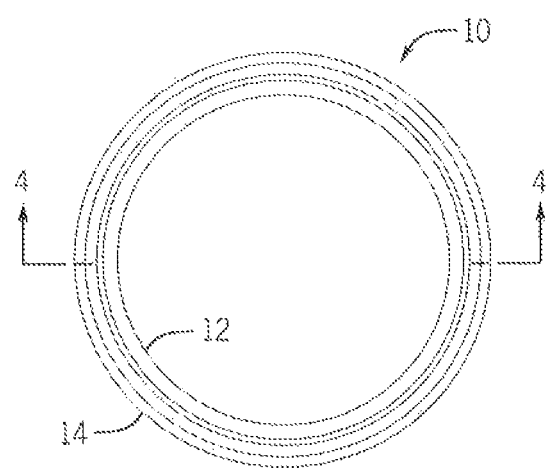
FIG. 2
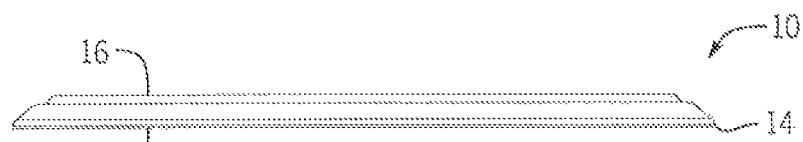
FIG. 3
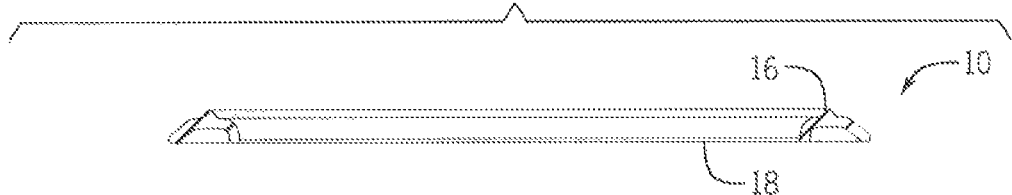
FIG. 4
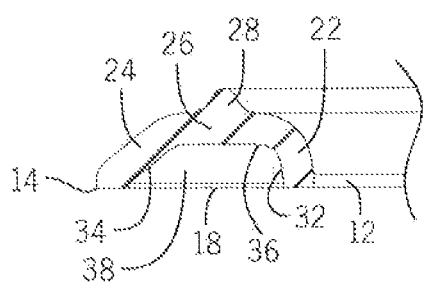
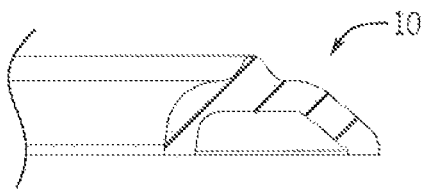

SEAL SURFACE ADAPTER FOR USE WITH TOILET FLUSH VALVES

PRIORITY CLAIM

This application claims priority to Provisional Patent Application No. 62/464,698, filed on Feb. 28, 2017.

FIELD OF THE INVENTION

The present invention relates generally to indoor plumbing and gravity-operated flush toilets. More particularly, the present invention relates to flapper valves that are used in such toilets and to a seal surface adapter that can be used on top of the seal surface of a flush valve to improve the seal surface of the flush valve and the flapper. It also relates to a seal surface adapter that can be used with a wide variety of flush valves of current manufacture.

BACKGROUND OF THE INVENTION

Conventional gravity-operated flush toilets have several basic components. The porcelain or china components include a bowl and a water tank mount on top of a rear portion of the bowl. The bowl and tank can be separate pieces bolted together to form a two-piece toilet. Other gravity-operated flush toilets are made as a one-piece toilet in which the bowl and tank are made as one continuous, integral piece of china.

More importantly, the plumbing components of a gravity-operated flush toilet include a fill valve in the tank which is connected to a water supply line, a flush valve surrounding a drain hole in the bottom of the tank that communicates with the bowl, and a flapper valve that normally closes and seals the flush valve or, more precisely, the main flush valve orifice.

Toilet flapper valves are typically formed as a single structure having a rim for sealing the rim of the main flush valve orifice with the flapper valve rim following flushing. The flapper valve is often formed of a soft elastomeric material and is hinged to allow the valve to be pivotally moved upwardly and away from the main flush valve orifice by means of a chain that is connected to the flush handle on the outside of the tank. Once the tank empties, the flapper valve then returns to a position where it seals the main flush valve orifice, the rim of soft elastomeric material forming a sealing area about the rim of that main flush valve orifice. A similar functionality is accomplished by use of a tower or canister flush valve that has a dedicated float that sits above a main seal. When the flush handle is rotated, the float is raised and a seal portion unseats vertically from the main seal.

In the experience of this inventor, the rim of the main flush valve orifice can become damaged or worn to the extent that the flapper fails to properly seat onto the rim of the main flush valve orifice, thereby failing to form a sealing area about the rim of that main flush valve orifice. Obviously, such a seal failure ultimately results in the leakage of water from the toilet tank reservoir. Annular seals commonly used in tower and canister flush valves have similar problems. To date, the only real solution to this particular problem was to replace the complete flush valve assembly. Though not particularly expensive to do so, swapping out the old flush valve assembly with a new one can be a time-consuming and messy task. It can also create other problems if the new flush valve assembly is not properly installed.

Accordingly, this inventor believes that there is a need for a simpler solution or eliminating water leakage created by a damaged or worn rim of a main flush valve orifice and the rim of the flapper or tower valve that rests upon it following flushing of the toilet. The seal surface adapter of the present invention fulfills that need.

SUMMARY OF THE INVENTION

In view of the foregoing, a primary objective of the device of the present invention is to provide a new, useful, and non-obvious seal surface adapter that can be used to cover the rim of the main flush valve orifice. The seal surface adapter can be applied or installed using an adhesive disposed within the adapter. Once installed, the improved device provides a leak-proof seat for the rim of the flapper or tower valve that is used in the toilet. Another objective of the device of the present invention is to provide a seal surface adapter structure that lends itself to "self-centering" such that the adapter can be used with a wide variety of flush valve assemblies of current manufacture.

The foregoing and other features of the seal surface adapter of the present invention will be apparent from the detailed description that follows.

BRIEF DESCRIPTION OF THE DRAWINGS

FIG. 1 is a perspective view of a toilet and of the toilet tank in particular, which is the environment in which the seal surface adapter in accordance with the present invention is used.

FIG. 2 is a top plan view of the seal surface adapter in accordance with the present invention.

FIG. 3 is a slightly enlarged front elevation view of the seal surface adapter shown in FIG. 2.

FIG. 4 is a front elevation and cross-sectioned view of the seal surface adapter taken along Line 4-4 of FIG. 2 and further showing an enlarged cross-sectional view of the seal surface adapter.

DETAILED DESCRIPTION

Figure 5:
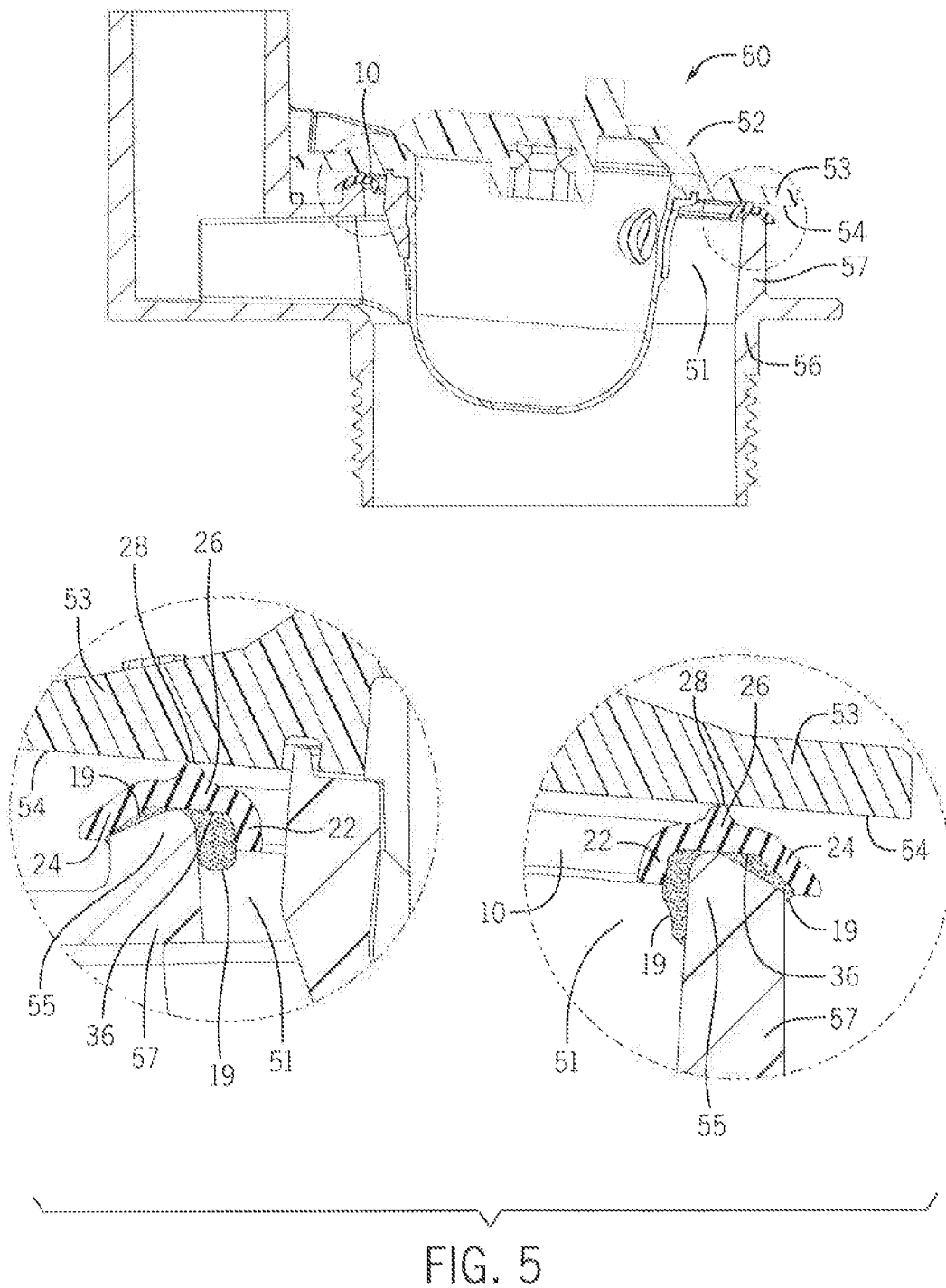
FIG. 5 includes multiple cross-sectioned elevational views of the seal surface adapter as used in a first exemplary flapper style flush valve.

Referring now to the drawings in detail, wherein like-numbered elements refer to like elements throughout, FIGS. 2 through 4 illustrate the preferred embodiment of a seal surface adapter, generally identified 10, that is constructed in accordance with the present invention. FIG. 1 shows the environment within which the device 10 is used. Specifically, a gravity-operated flush toilet, generally identified 1, is provided and comprises a bowl 2, a water tank 3 mounted on top of a rear portion of the bowl 2, and a water tank cover 4. Water from the tank 3 empties into the bowl 2 when a flush level 5 is pushed downwardly. Disposed within the tank 3 is a flush valve assembly, generally identified 6. These elements are well-known in the art.

Referring again to FIGS. 2 through 4, it can be seen that the seal surface adapter 10 is a ring-like structure comprising an inner perimeter 12 and an outer perimeter 14. The seal surface adapter 10 further comprises a top portion 16 and a bottom portion 18. Moving upwardly from the bottom portion 18, the inner perimeter 12 is bounded by a first leg 22 and the outer perimeter 14 is bounded by a second leg 24. The first leg 22 extends upwardly from the bottom portion 18 and extends at a slight angel away from vertical. The second leg 24 likewise extends upwardly, but at somewhat more of an angle away from vertical. It should be noted also that the first leg 22 arches as it moves away from the bottom portion 18 of the adapter 10, whereas the second leg 24 is more linear as it moves away from the bottom portion 18 of the adapter 10.

The first leg 22 and the second leg 24 terminate at, and are integrally connected by, a horizontal portion 26 that spans between the legs 22, 24. Extending upwardly from the top portion 16 of the adapter 10, and upwardly from the horizontal portion 26, is a ridge 28, which lays within a flat plane. Under the seal surface adapter 10, the first leg 22 comprises a first leg inner surface 32, the second leg comprises a second leg inner surface 34, and the horizontal portion 26 comprises a horizontal portion inner surface 36. Together, the inner surfaces 32, 34, 36 are adjoining and form a channel 38 which, in cross-section, is configured roughly in the shape of an irregular polygon. This cross-section is so configured to accommodate a wide variety of main flush valve orifice rims and to provide a self-centering structure relative to such rims.

Referring now to FIG. 5, a cross-section of a first preferred embodiment of a combined flush valve and flapper valve, generally identified 50, with which the seal surface adapter 10 is used is shown. Two components are prominent: a flapper valve 52 and a flush valve 56 that the flapper valve 52 may be secured to. The flapper valve 52 covers the orifice 51 of the flush valve 56. More specifically, the flapper valve 52 comprises a rim 53 having an underside surface 54. This underside surface 54 is configured to sealingly engage the top rim 55 of the flush valve wall 57, which is part of the flush valve 56. The flapper valve 52 (for all embodiments herein, including the seal counterpart for the tower or canister style flush valve) is typically made of an elastomeric material such as real or synthetic rubber having a suitable durometer or softness. In all preferred embodiments, the flapper may be comprised of a real rubber material for suitable sealing with chemical resistance by virtue of CHLORAZONE® additive (CHLORAZONE is a registered trademark of Lavelle Industries, Inc.).

Still referring to FIG. 5, and as is shown in relation to this particular embodiment, the horizontal portion inner surface 36 of the seal surface adapter 10 rests on the top rim 55 of the flush valve wall 57. In turn, the underside surface 54 rests on the ridge 28 of the seal surface adapter 10. More specifically, the top rim 55 is in contact with the horizontal portion inner surface 36 of the seal surface adapter 10 and is disposed more closely to the second leg 24 of the adapter 10. As is shown in FIG. 10, it is to be appreciated that, prior to placement of the adapter 10 to the rim 55, a bead of adhesive 19 is applied to the channel 38 of the seal surface adapter 10. Once application of the bead 19 within the channel 38 is completed (by application in a full 360° of the adapter 10), the seal surface adapter 10 is then inverted and placed onto the top rim 55 of the flush valve wall 57, thereby creating a complete and impervious seal about the top rim 55 when the adhesive cures sufficiently to provide a water barrier. This will be true for each of the other embodiments illustrated herein and discussed below. The two lower illustrations shown in FIG. 5, which are fore and aft portions of the combined flush valve and flapper valve 550, demonstrate how the adapter 10 and adhesive 19 adhere to the top rim 55, with some amount of the adhesive 19 oozing out of the channel 38 on application. This illustrative pattern will be followed relative to FIGS. 6-9 as well.

Figure 6:
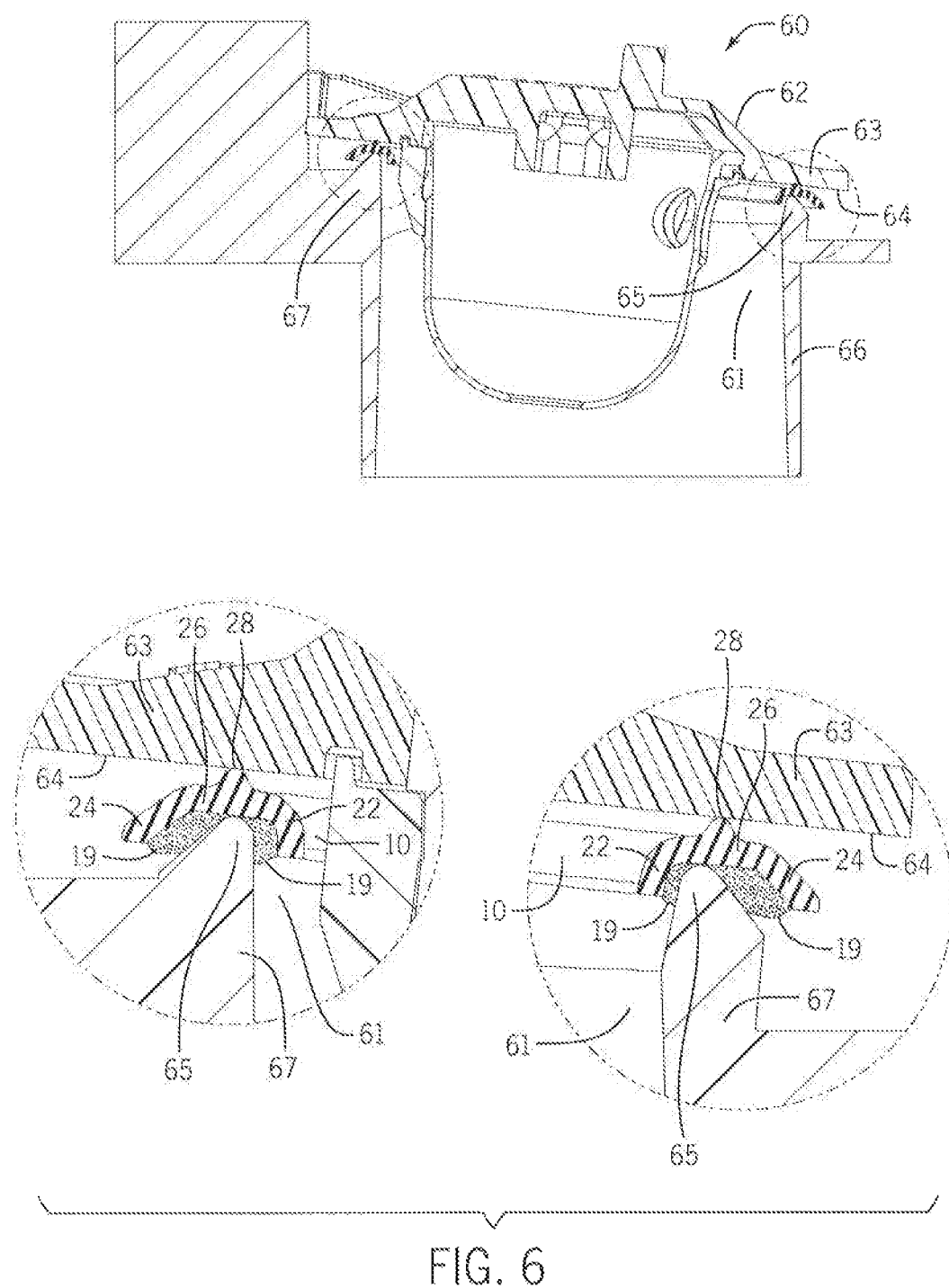
FIG. 6 includes multiple cross-sectioned elevational views of the seal surface adapter as used in a second exemplary flapper style flush valve.

Referring to FIG. 6, it shows the cross section of another preferred embodiment of a combined flush valve and flapper valve, generally identified 60, with which the seal surface adapter 10 can be used. Again, two prominent components are the flapper valve 62 and the flush valve 66. The flapper valve 62 covers the orifice 61 of the flush valve 66. The flapper valve 62 comprises a rim 63 having an underside surface 64. This underside surface 64 is configured to sealingly engage the top rim 65 of the flush valve wall 67, which is part of the flush valve 66. In this configuration, the top rim 65 is disposed more closely to the center 26 of the seal surface adapter 10. Any gaps formed between the top rim 65 and the seal surface adapter 10 are filled with the adhesive 19 as described above.

Figure 7:
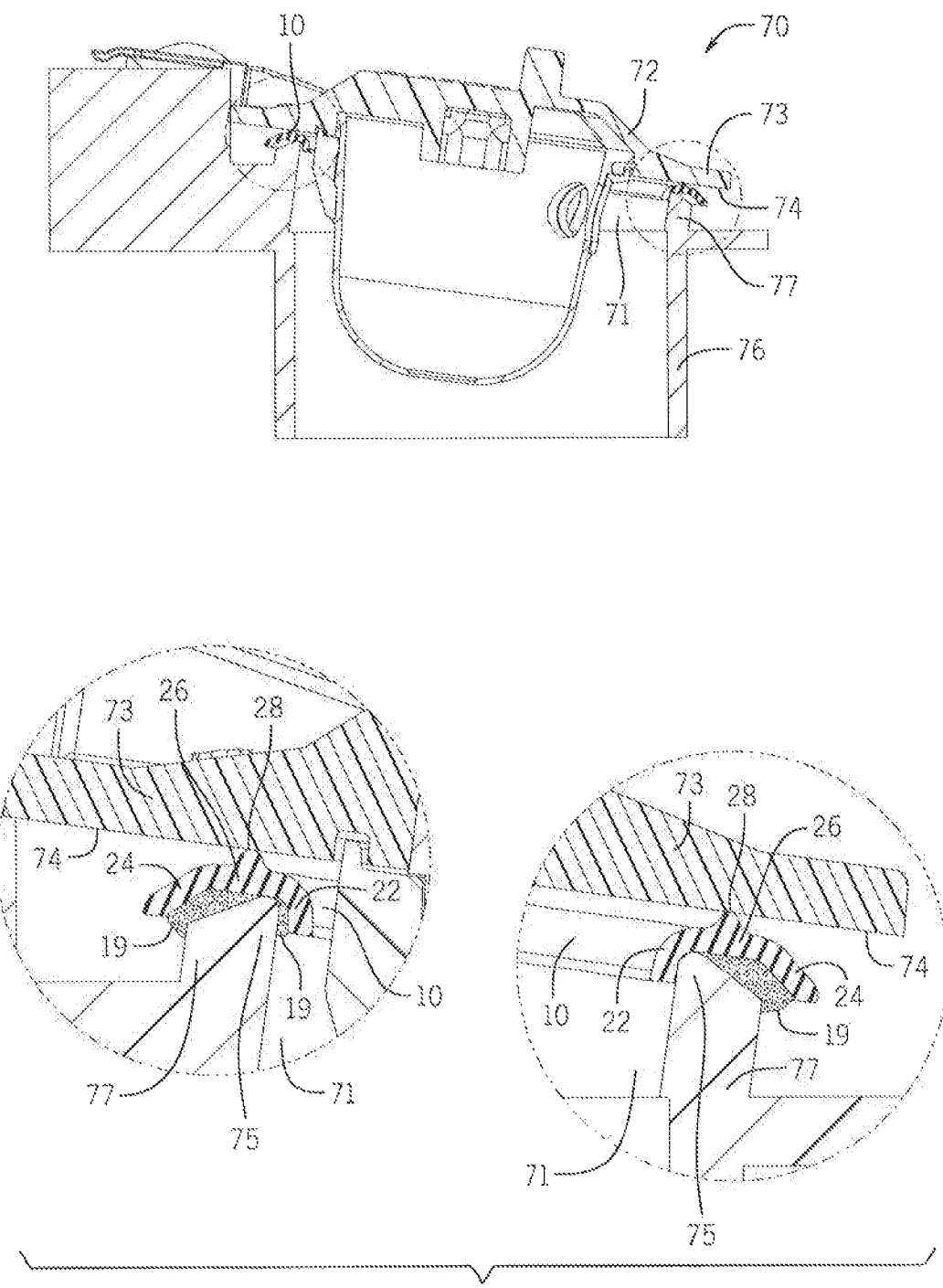
FIG. 7 includes multiple cross-sectioned side elevational views of the seal surface adapter as used in a third exemplary flapper style flush valve.

Referring now to FIG. 7, a cross-section of still another preferred embodiment of a combined flush valve and flapper valve, generally identified 70, with which the seal surface adapter 10 is used is shown. More specifically, a flapper valve 72 and a flush valve 76 that the flapper valve 72 may be rotatably secured to is shown. The flapper valve 72 covers the orifice 71 of the flush valve 76. The flapper valve 72 likewise comprises a rim 73 having an underside surface 74. This underside surface 74 is configured to sealingly engage the top rim 75 of the flush valve wall 77, which is part of the flush valve 76. In this configuration, the top rim 75 is disposed more closely to the first leg 22 of the seal surface adapter 10. Any gaps formed between the top rim 75 and the seal surface adapter 10 are filled with the adhesive 19 as well.

Figure 8:
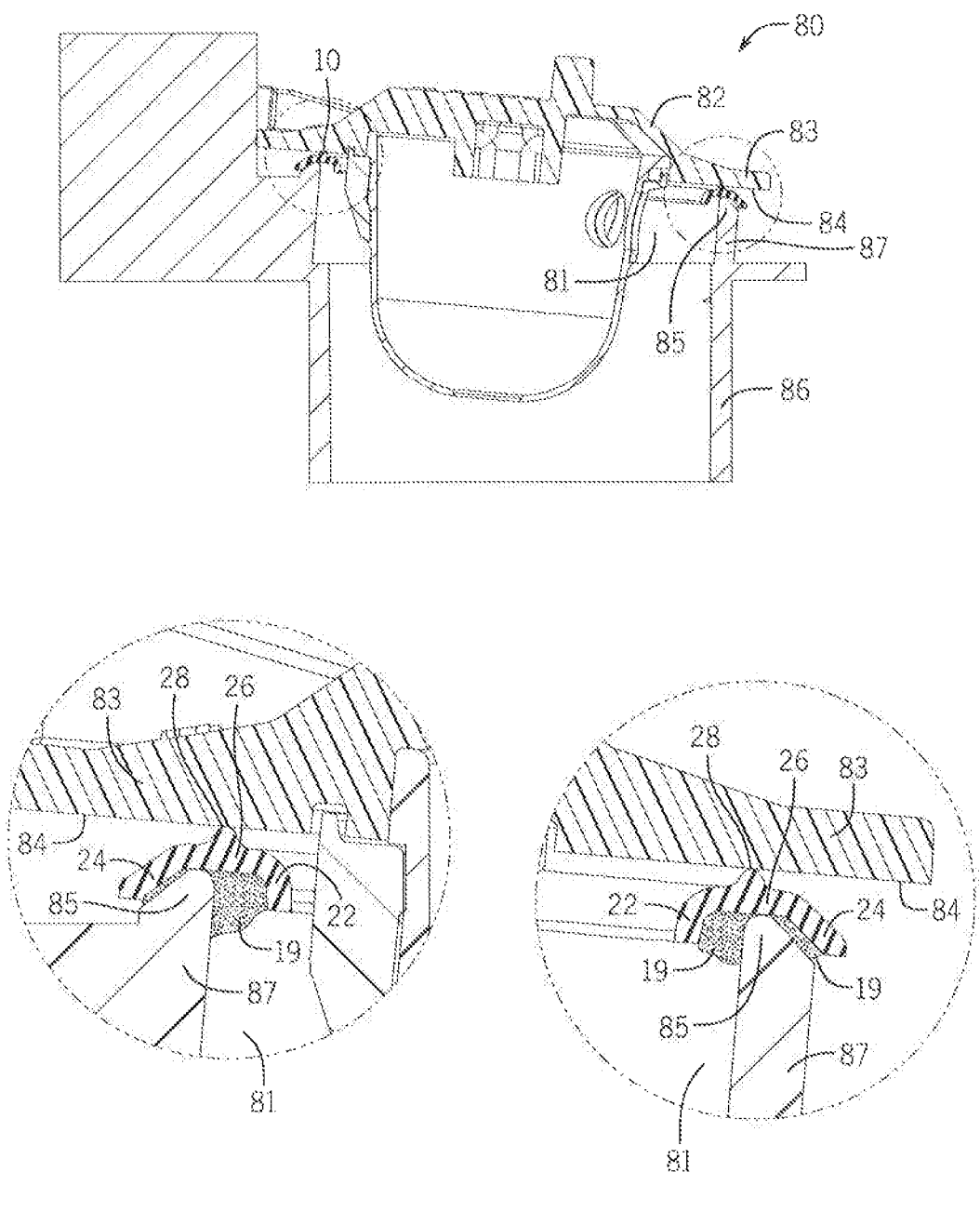
FIG. 8 includes multiple cross-sectioned side elevational views of the seal surface adapter as used in a first exemplary flapper style flush valve.

FIG. 8 shows the cross-section of yet another preferred embodiment of a combined flush valve and flapper valve, generally identified 80, with which the seal surface adapter 10 is used. The combination comprises a flapper valve 82 and a flush valve 86 that the flapper valve 82 may be secured to. The flapper valve 82 covers the orifice 81 of the flush valve 86. More specifically, the flapper valve 82 comprises a rim 83 having an underside surface 84. This underside surface 84 is configured to sealingly engage the top rim 85 of the flush valve wall 87, which is part of the flush valve 86. In this configuration, the top rim 85 is disposed more closely to the second leg 24 of the seal surface adapter 10. Again, any gaps formed between the top rim 85 and the seal surface adapter 10 are filled with the adhesive 19 which, when cured, will provide an impervious barrier to water leaking between the top rim 85 and the seal surface adapter 10.

Figure 9:
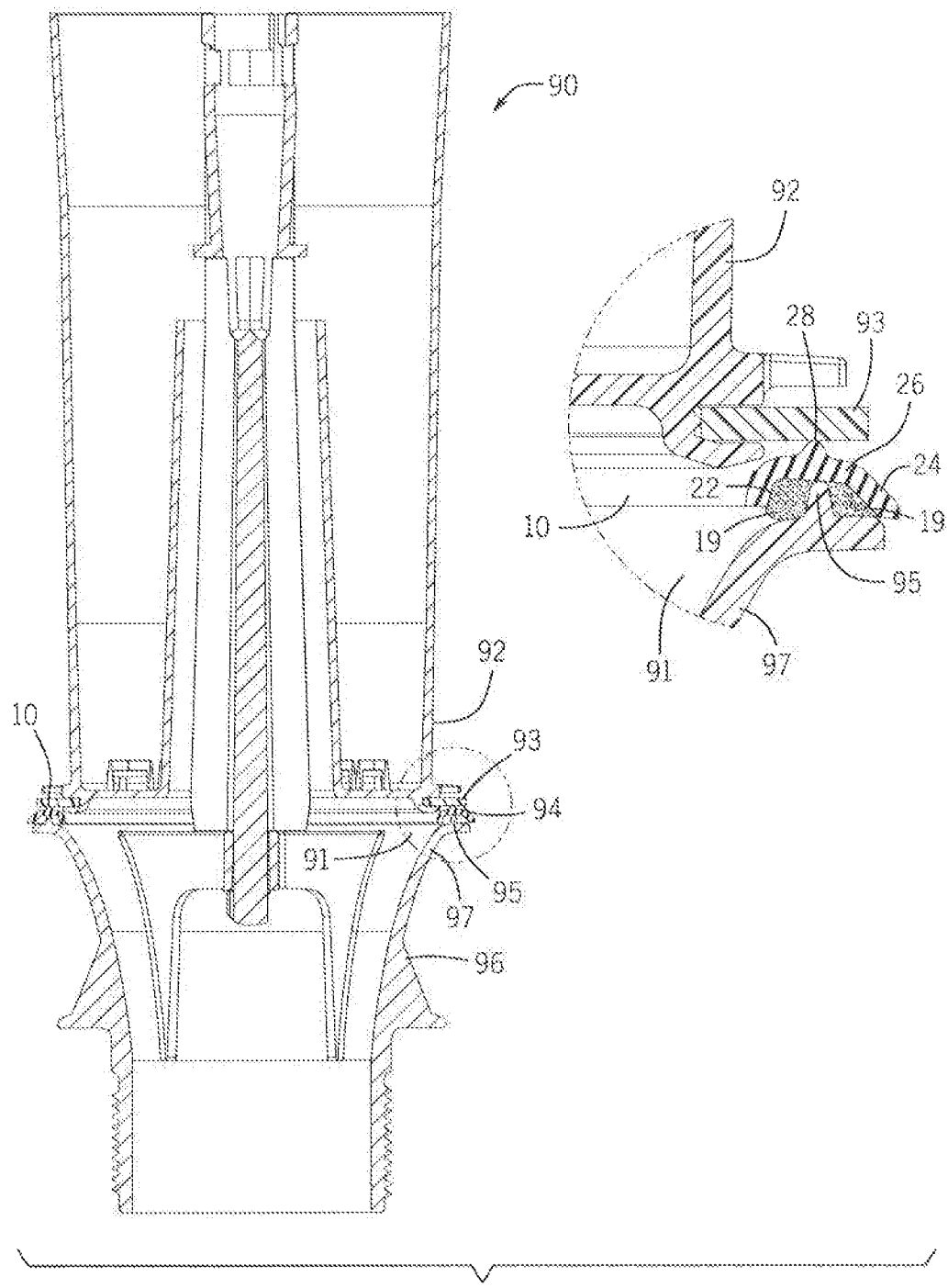
FIG. 9 includes two cross-sectioned side elevational views of the seal surface adapter as used with a tower or canister style flush valve.
Figure 10:
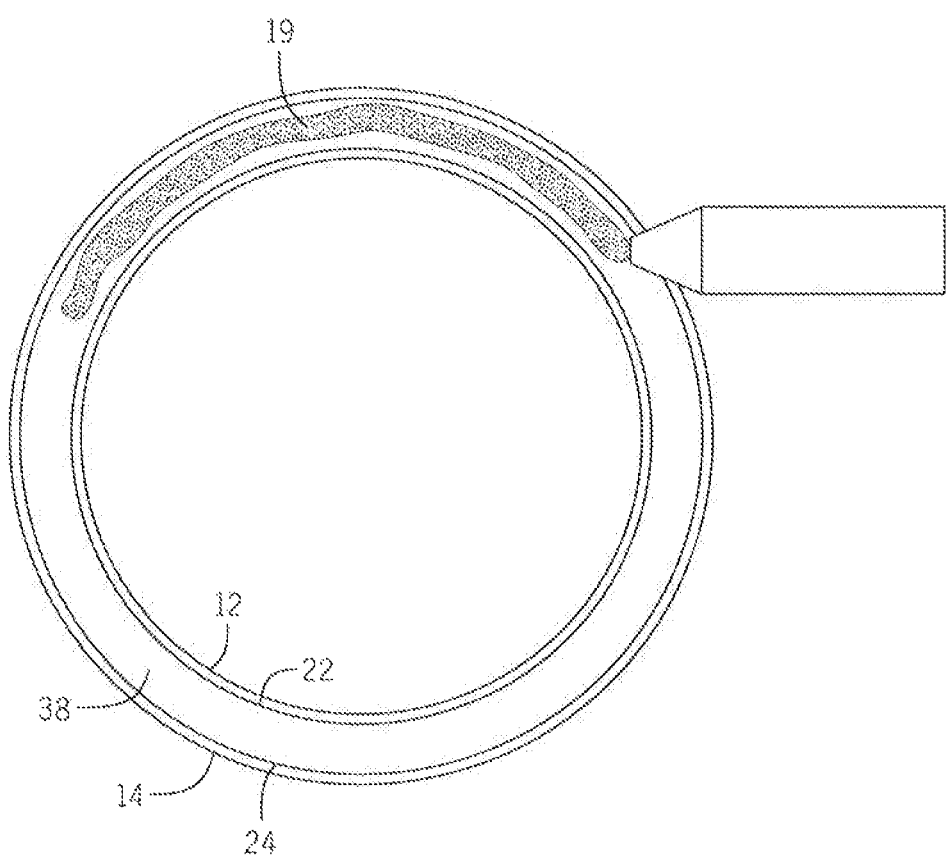
FIG. 10 is a bottom plan view of the seal surface adapter showing the application of a bead of adhesive to the channel.

Referring lastly to FIG. 9, a cross-section of an exemplar tower style flush valve assembly, generally identified 90, with which the seal surface adapter 10 can be used is shown. This combination comprises a flush cover member 92 and a base member 96; the base member 96 further comprises a wall 97 and an orifice 91. The cover member 92 comprises a seal 93 having an underside surface 94. The underside surface 94 of the seal 93 covers the top rim 95 of the base member 96 when the tank is filled or is filling with water. In this configuration, the top rim 95 is disposed somewhat equally between the first leg 24 and the second leg 22 of the seal surface adapter 10. Any gaps between the top rim and the seal surface adapter 10 are filled with the adhesive 19. As described previously, the adhesive 19 will, when cured, provide an impervious barrier to water leaking between the top rim 95 and the seal surface adapter 10. The underside surface 94 of the seal 93 of the cover member thus "sits" on the ridge 28 of the adapter 10 instead of on the rim 95.

The invention claimed is:

1. A seal surface adapter for use with a toilet flush valve, comprising: a ring, wherein the ring is a rigid structure that is configured to be positioned at a top of a rigid flush valve wall of a toilet flush valve and the ring further comprises: a bottom portion; a first leg, wherein the first leg extends upwardly from the bottom portion and further extends outwardly of the ring at a first angle, the first angle being slightly away from vertical, a second leg, wherein the second leg extends upwardly from the bottom portion and further extends inwardly of the ring at a second angle away from vertical, the second angle being substantially greater than that of the first angle; and a horizontal portion connecting the first leg and the second leg.

2. The seal surface adapter of claim 1, further comprising a ridge extending upwardly with respect to the horizontal portion, wherein the ridge is configured to be a seat for a rim of an elastomeric flapper valve.

3. The seal surface adapter of claim 1, wherein the ring further comprises:
an inner perimeter; and
an outer perimeter.

4. The seal surface adapter of claim 3, wherein:
the inner perimeter is bounded by the first leg; and
the outer perimeter is bounded by the second leg.

5. The seal surface adapter of claim 1, wherein:
the first leg further comprises a first leg inner surface;
the second leg further comprises a second leg inner surface; and
the horizontal portion further comprises a horizontal portion inner surface.

6. The seal surface adapter of claim 5, wherein:
the first leg inner surface, the second leg inner surface, and the horizontal portion inner surface adjoin; and
the adjoined inner surfaces form a channel, wherein the channel is configured to receive a bead of adhesive to create an impervious water barrier between the ring and the top of the flush valve wall of the flush valve.

7. The seal surface adapter of claim 6, wherein the channel is configured in the shape of an irregular polygon.

8. A seal surface adapter for use with a toilet flush valve, comprising:
a rigid ring, wherein:
the ring comprising:
an inner perimeter; and
an outer perimeter; and
the ring is configured to be positioned atop a rigid flush valve wall of a toilet flush valve, the ring further comprising:
a bottom portion;
a first leg, wherein:
the first leg bounds the inner perimeter;
the first leg extends upwardly from the bottom portion;
the first leg includes a first leg inner surface; and
the first leg is configured to be disposed to an inside of a cylindrical flush valve wall of a flush valve;
a second leg, wherein:
the second leg bounds the outer perimeter;
the second leg extends upwardly from the bottom portion;
the second leg includes a second leg inner surface; and
the second leg is configured to be disposed to the outside of the flush valve wall of the flush valve; and
a horizontal portion disposed between the first leg and the second leg, wherein the horizontal portion further comprises a horizontal portion inner surface,
wherein the first leg serves as a centering structure and the second leg serves as an extension structure that allows the adapter to cover the top of the flush valve wall irrespective of the diameter of the flush valve wall.

9. The seal surface adapter of claim 8, further comprising a channel, wherein:
the channel is formed from the first leg inner surface, the second leg inner surface, and the horizontal portion inner surface; and
the channel is configured in the shape of an irregular polygon.

10. The seal surface adapter of claim 9, wherein the channel is configured to sealingly mate with a flush valve wall of a toilet flush valve.

11. The seal surface adapter of claim 10, further comprising adhesive, wherein:
the adhesive is placed within the channel; and
the adhesive is to interact with the flush valve wall of the flush valve when the apparatus is mated with the flush valve to create a water barrier.

12. The seal surface adapter of claim 8, wherein the first leg extends upwardly from the bottom portion at a first angle with respect to vertical.

13. The seal surface adapter of claim 12, wherein the first leg arches away from the bottom portion as it extends upwardly.

14. The seal surface adapter of claim 8, wherein:
the second leg extends upwardly from the bottom portion at a second angle with respect to vertical; and
the second angle is greater than the first angle.

15. The seal surface adapter of claim 14, wherein the second leg extends upwardly in a substantially linear fashion.

16. The seal surface adapter of claim 2 wherein the top of the rigid flush valve wall of the toilet flush valve comprises a diameter and further comprises an inner cylindrical surface and an outer cylindrical surface such that, when the adapter is placed over the top of the rigid flush valve wall, the first leg seats inside the inner cylindrical surface and the second leg seats outside the outer cylindrical surface wherein the first leg serves as a centering structure and the second leg serves as an extension structure that allows the adapter to cover the top of the flush valve wall irrespective of the diameter of the flush valve wall.

17. The seal surface adapter of claim 2 wherein the top of the rigid flush valve wall of the toilet flush valve comprises a diameter and further comprises an inner cylindrical surface and an outer cylindrical surface such that, when the adapter is placed over the top of the rigid flush valve wall, the first leg seats inside the inner cylindrical surface and the second leg seats outside the outer cylindrical surface wherein the first leg serves as a centering structure and the second leg serves as a reaching structure that allows the adapter to extend outwardly and beyond the flush valve wall of the toilet flush valve so as to cover the top of the flush valve wall irrespective of the diameter of the flush valve wall.

* * * * *